United States Patent
Kim et al.

[11] Patent Number: 6,117,586
[45] Date of Patent: Sep. 12, 2000

[54] CAP ASSEMBLY OF BATTERY

[75] Inventors: Chang-seob Kim, Chunan; Hyun-woo Kim, Sungnam; Ki-woong Jang, Chunan; E-ju Hwang, Suwon; Eui-sun Hong; Yoshiaki Miura, both of Chunan, all of Rep. of Korea

[73] Assignee: Samsung Display Devices, Ltd., Kyungki-Do, Rep. of Korea

[21] Appl. No.: 09/165,308

[22] Filed: Oct. 2, 1998

[30] Foreign Application Priority Data

Oct. 10, 1997 [KR] Rep. of Korea ............... 97-52029

[51] Int. Cl.$^7$ ...................................... H01M 2/04
[52] U.S. Cl. ............................................. 429/175
[58] Field of Search ....................... 429/57, 56, 59, 429/181, 185

[56] References Cited

U.S. PATENT DOCUMENTS

| | | | |
|---|---|---|---|
| 3,615,868 | 10/1971 | Melone | 136/178 |
| 3,915,752 | 10/1975 | Gross | 136/170 |
| 3,992,226 | 11/1976 | Godshalk | 429/89 |
| 4,098,963 | 7/1978 | Mocas | 429/88 |
| 4,186,247 | 1/1980 | Mocas | 429/88 |
| 4,562,127 | 12/1985 | Mangone | 429/71 |
| 4,978,592 | 12/1990 | Dattilo | 429/89 |
| 5,532,075 | 7/1996 | Alexandres | 429/54 |
| 5,588,970 | 12/1996 | Hughett | 29/623.2 |
| 5,609,972 | 3/1997 | Kaschmitter et al. | |

FOREIGN PATENT DOCUMENTS

| | | |
|---|---|---|
| 0 689 255 | 12/1995 | European Pat. Off. . |
| 96/01504 | 1/1996 | WIPO . |

*Primary Examiner*—Maria Nuzzolillo
*Assistant Examiner*—Mark Ruthkosky
*Attorney, Agent, or Firm*—Lowe Hauptman Gopstein Gilman & Berner

[57] ABSTRACT

A cap assembly of a battery, comprising: a cap plate for covering the upper portion of a battery case; a positive terminal installed on the cap plate, insulated from the cap plate; a rivet member having a rivet protrusion, through which a vent hole is formed, inserted through holes formed in the cap plate and the positive terminal for riveting them together, the rivet member electrically connected to the positive terminal; a safety member installed at the lower end of rivet member, blocking the vent hole; and a positive tap fixing member attached to the lower end of the safety member and joined to a positive tap of an electrode assembly in the battery case, wherein the safety member is ruptured and separated from the positive tap fixing member by an internal pressure increase of the battery case.

5 Claims, 3 Drawing Sheets

CAP ASSEMBLY OF BATTERY

BACKGROUND OF THE INVENTION

1. Field of the Invention

The present invention relates to a battery, and more particularly, to a cap assembly of a battery having an improved structure which can be electrically disconnected from other parts when a safety member is ruptured due to the accidental internal pressure increase of the battery.

2. Description of the Related Art

As portable appliances such as video cameras, mobile phones and portable computers become lighter and more versatile, research has been concentrated on batteries to power such appliances. Among conventional batteries, a lithium secondary (i.e. rechargeable) battery has about 3 times the energy density per unit weight of conventional batteries such as a lead acid battery, a Ni-Cd battery, and a Ni-H battery, and can be fast charged. In the lithium secondary battery, lithium cobalt oxide ($LiCoO_2$), lithium nickel oxide ($LiNiO_2$), lithium manganese oxide ($LiMn_2O_4$) or the like is used as an active material of a positive electrode, and lithium, lithium alloys, a carbon material or the like is used as an active material of a negative electrode. In addition, organic electrolyte or solid polymer electrolyte is used as an electrolyte. In general, the shape of a secondary battery is cylindrical or rectangular, and the rectangular shape is advantageous to making the portable appliances light and small.

Referring to FIG. 1, a conventional lithium secondary battery of a rectangular shape comprises a battery case 17 for accommodating an electrode core (not shown) which is alternately laminated with positive electrode plates and negative electrode plates having separators therebetween, and a cap assembly 10 attached to the upper portion of the battery case 17.

The cap assembly 10 includes a cap plate 12 for covering the upper portion of the battery case 17, a positive terminal 11 installed on the cap plate 12, and a rivet member 15 inserted through holes formed in the positive terminal 11 and the cap plate 12, for joining the positive terminal 11 to the cap plate 12. A first insulating member 13 is interposed between the positive terminal 11 and the cap plate 12, and the cap plate 12 and the rivet member 15 are insulated from each other by a second insulating member 14.

A positive tap 16 which is connected to the positive electrode plates (not shown) is welded to the rivet member 15. In addition, the battery case 17 is connected to a negative tap (not shown).

An electrolyte injection hole 12a for injecting an electrolyte into the battery case 17 is formed at one side of the cap plate 12, and a rupturing portion 12b is formed at the other side of the cap plate 12, to rupture when the internal pressure of the battery is abnormally high.

When the internal pressure of the lithium secondary battery is abnormally high, the rupturing portion 12a of the cap plate 12 ruptures, and gas within the battery is exhausted. At this time, since the battery is still electrically connected, and has no electrical safety means, the portable appliance in which the battery is used may suffer a subsequent accident such as an electrical shock.

SUMMARY OF THE INVENTION

To solve the above problem, it is an objective of the present invention to provide a cap assembly of a battery which can exhaust gas within the battery, and simultaneously break the electrical path of the battery Accordingly, to achieve the above objective, there is provided a cap assembly of a battery, comprising: a cap plate for covering the upper portion of a battery case; a positive terminal installed on the cap plate, insulated from the cap plate; a rivet member having a rivet protrusion, through which a vent hole is formed, inserted through holes formed in the cap plate and the positive terminal for riveting them together, the rivet member electrically connected to the positive terminal; a safety member installed at the lower end of rivet member, blocking the vent hole; and a positive tap fixing member attached to the lower end of the safety member and joined to a positive tap of an electrode assembly in the battery case, wherein the safety member is ruptured and separated from the positive tap fixing member by an internal pressure increase of the battery case.

The safety member and the positive tap fixing member are joined to each other by welding.

The safety member is preferably formed in the shape of a hemisphere.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
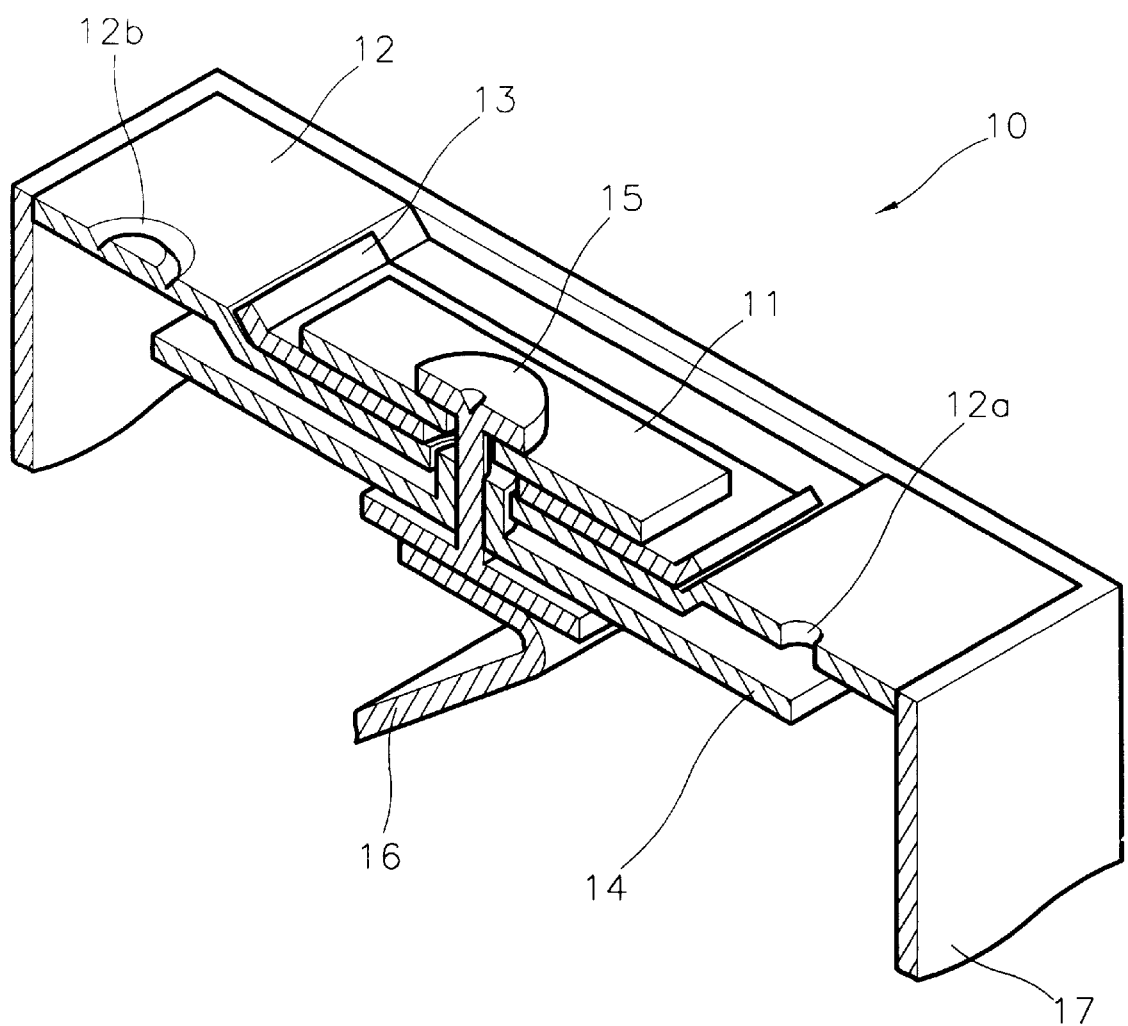
FIG. 1 is a cut away perspective view illustrating a cap assembly of a conventional lithium battery of a rectangular shape.
Figure 2:
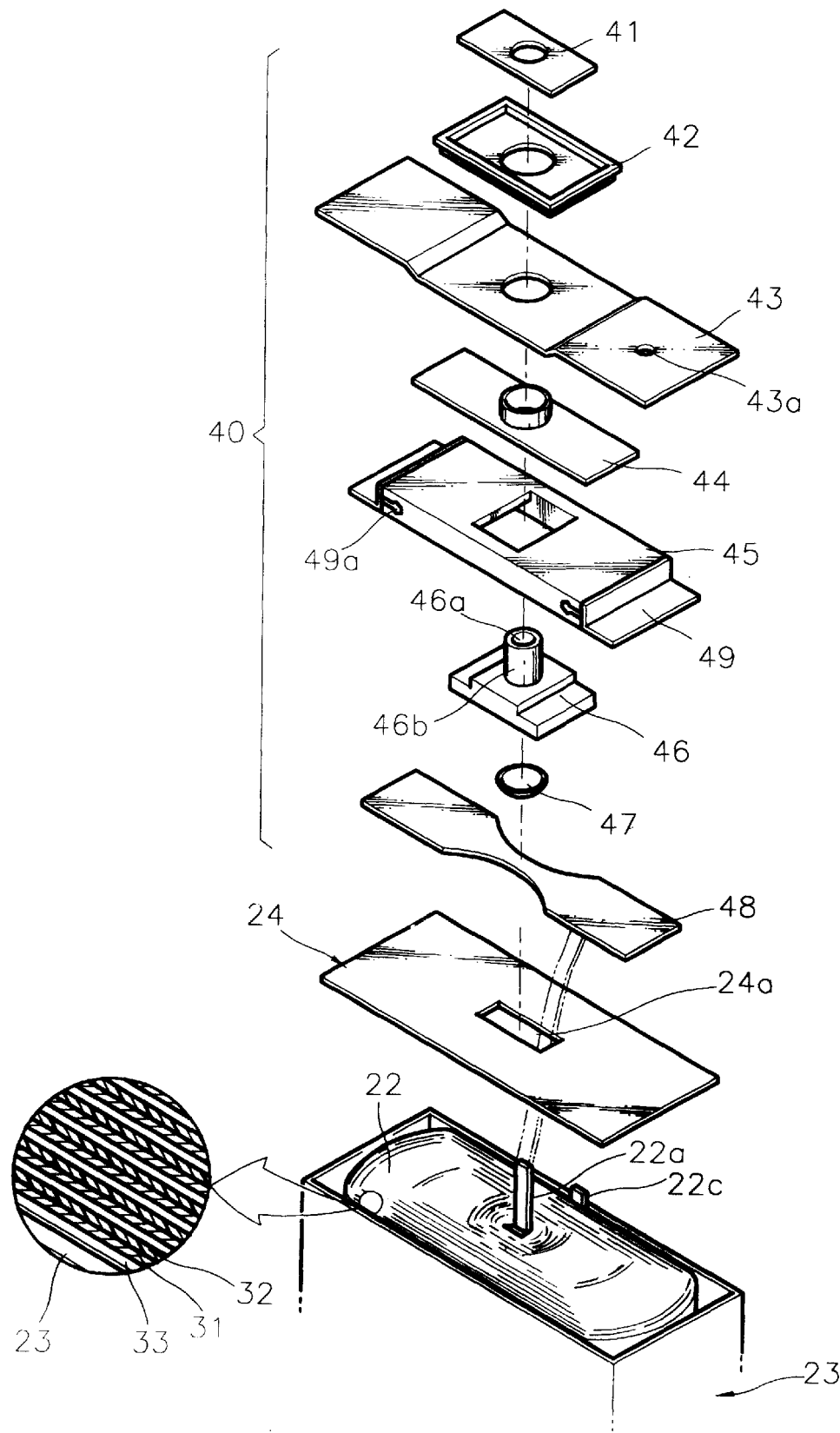
FIG. 2 is a exploded perspective view illustrating a cap assembly of a battery according to the present invention.

FIG. 2 shows a secondary battery which employs a cap assembly according to the present invention. Referring to FIG. 2, a battery case 23 accommodates an electrode core 22 which is laminated of alternating negative electrode plates 32 and positive electrode plates 33, having separators 31 therebetween. The positive electrode plates 33 and the negative electrode plates 32 are connected to a positive tap 22a and a negative tap 22c, respectively. The negative tap 22c is connected to the battery case 23.

An insulating plate 24 is positioned on the electrode core 22, and the positive tap 22a projects through a hole formed in the insulating plate and is attached to a positive tap fixing member 48.

A battery cap assembly 40 according to the present invention is installed on the battery case 23.

Figure 3:
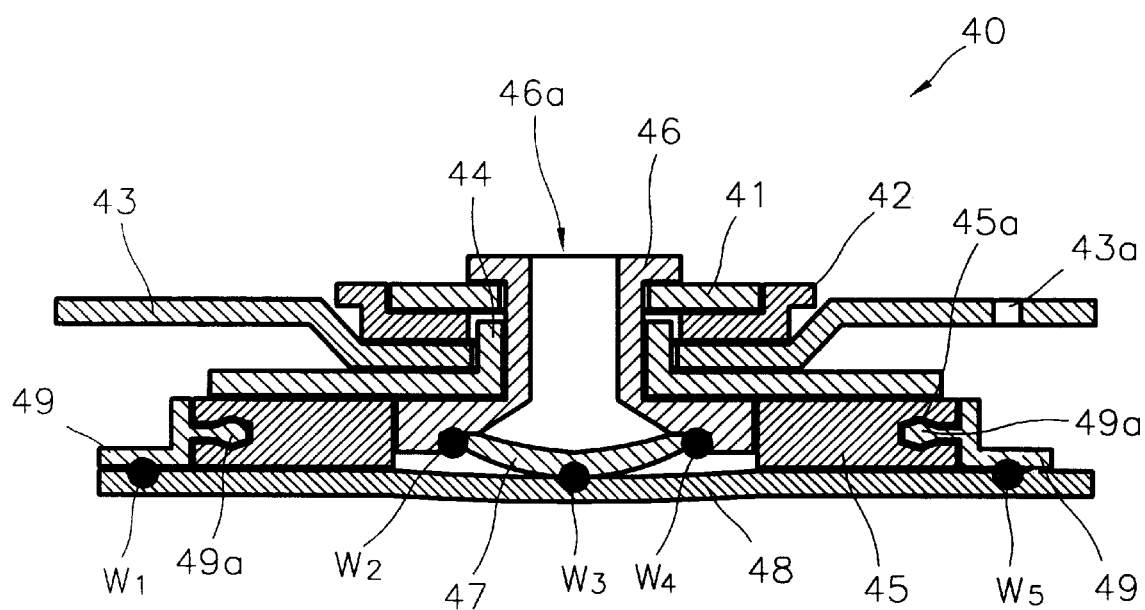
FIG. 3 is a sectional view illustrating an assembled cap assembly of FIG. 2.

Referring to FIGS. 2 and 3, the cap assembly 40 includes a cap plate 43 for covering the upper portion of the battery case 23, and a positive terminal 41 installed on the cap plate 43. A first insulating member 42 is interposed between the positive terminal 41 and the cap plate 43. A gasket 44 having an insulating function is attached to the lower surface of the cap plate 43. An electrolyte injection hole 43a is formed at the cap plate 43 for injecting an electrolyte containing a lithium salt into the battery case 23.

The cap plate 43, the first insulating member 42, the positive terminal 41 and the gasket 44 are riveted together by a rivet member 46. A rivet protrusion 46b of the rivet member 46 is inserted through holes formed in the cap plate 43, the first insulating member 42, the positive terminal 41 and the gasket 44, for riveting them. A vent hole 46a is formed in the rivet protrusion 46*b* through the rivet member 46, and the vent hole 46*a* communicates with the inside of the battery case 23 when the battery has been assembled.

The rivet member 46 is insulated from the cap plate 43 by a second insulating member 45 interposed therebetween. As shown in FIGS. 2 and 3, auxiliary metal members 49 may be attached to the sides of the second insulating member 45. That is, the auxiliary metal members 49 can be attached to the second insulating member 45 by a projection 49*a* formed on the auxiliary metal members 49 which fits into a slot 45*a* formed in the second insulating member 45. The auxiliary metal members 49 serve to securely fix the positive tap fixing member 48.

A safety member 47 is installed at the lower end of rivet member 46 for blocking the vent hole 46*a*. It is preferable that the circumferential surface of the safety member 47 is welded to the lower end of the rivet member 46 at welding points W2 and W4. The safety member 47 is preferably formed in the shape of a hemisphere.

In addition, the lowest point of the safety member 47 is welded to the positive tap fixing member 48 at a welding point W3. The positive tap fixing member 48 is welded to the auxiliary metal member 49 at welding points W1 and W5.

In the operation of a battery employing the cap assembly as described above, a current flows from the electrode core 22 to the positive terminal 41 via the positive tap 22*a*, the positive tap fixing member 48, the safety member 47, and the rivet member 46, in sequence.

When the battery operates abnormally and generates gas, the internal pressure of the battery case is raised. Most reasons for the internal pressure increase of a battery are due to internal shock of the battery or a short circuit. When an excess current flows because of a battery abnormality, organic solvent of the battery is vaporized by exothermic phenomena in the battery, and the internal pressure rises.

When the internal pressure of the battery rises, the safety member 47 is deformed by the high pressure, and is separated from the positive tap fixing member 48. Accordingly, the battery current can not flow. Then, the safety member 47 continues to deform toward the vent hole 46*a* of the rivet member 46 and finally ruptures. As a result, the inside of the battery case 23 communicates with the vent hole 46*a*, and the gas in the battery can be exhausted through the vent hole 46*a*. Therefore, the internal pressure is released.

With the cap assembly according to the present invention, when a high internal pressure ruptures the safety member, the gas in the battery is exhausted, and simultaneously the current flow is blocked. Consequently, the battery is safer.

What is claimed is:

1. A cap assembly of a battery, comprising:

a cap plate for covering the upper portion of a battery case;

a positive terminal installed on the cap plate, insulated from the cap plate;

a rivet member having a rivet protrusion, through which a vent hole is formed, inserted through holes formed in the cap plate and the positive terminal for riveting them together, the rivet member electrically connected to the positive terminal;

a safety member installed at the lower end of rivet member, blocking the vent hole; and a positive tap fixing member attached to the lower end of the safety member and joined to a positive tap of an electrode assembly in the battery case, wherein the safety member is ruptured and separated from the positive tap fixing member by an internal pressure increase of the battery case.

2. The cap assembly of a battery as claimed in claim 1, wherein the safety member and the positive tap fixing member are joined to each other by welding.

3. The cap assembly of a battery as claimed in claim 1, wherein the safety member is formed in the shape of a hemisphere.

4. The cap assembly of a battery as claimed in claim 1, wherein the cap assembly further comprises: a first insulating member interposed between the positive terminal and the cap plate; and a second insulating member interposed between the cap plate and the positive tap fixing member.

5. The cap assembly of a battery as claimed in claim 4, wherein auxiliary metal members to which the positive tap fixing member is fixed are attached to the second insulating member.

* * * * *